(12) United States Patent
Ikeda et al.

(10) Patent No.: US 7,402,918 B2
(45) Date of Patent: Jul. 22, 2008

(54) ARRANGEMENT STRUCTURE OF ELECTRIC JUNCTION BOX

(75) Inventors: Tomohiro Ikeda, Shizuoka (JP);
Yoshiaki Ichikawa, Shizuoka (JP);
Shigeki Matsumoto, Shizuoka (JP); Ko Watanabe, Aichi (JP); Takenori Tsuchiya, Aichi (JP)

(73) Assignees: Yazaki Corporation, Tokyo (JP);
Toyota Jidosha Kabushiki Kaisha, Toyota-shi (JP)

( * ) Notice: Subject to any disclaimer, the term of this patent is extended or adjusted under 35 U.S.C. 154(b) by 294 days.

(21) Appl. No.: 11/195,844

(22) Filed: Aug. 3, 2005

(65) Prior Publication Data

US 2006/0030176 A1 Feb. 9, 2006

(30) Foreign Application Priority Data

Aug. 4, 2004 (JP) ............................. 2004-227835

(51) Int. Cl.
*B60L 1/00* (2006.01)
(52) U.S. Cl. ...................................... 307/9.1
(58) Field of Classification Search ................ 307/9.1
See application file for complete search history.

(56) References Cited

U.S. PATENT DOCUMENTS

| 5,547,208 | A | * | 8/1996 | Chappell et al. | ............ 180/281 |
| 5,681,057 | A | * | 10/1997 | Whirley et al. | ............ 280/784 |
| 2004/0048142 | A1 | * | 3/2004 | Marusak et al. | ............ 429/61 |

FOREIGN PATENT DOCUMENTS

JP          9-277840          10/1997

* cited by examiner

*Primary Examiner*—Robert L. Deberadinis
(74) *Attorney, Agent, or Firm*—Kratz, Quintos & Hanson, LLP

(57) ABSTRACT

An arrangement structure of an electric junction box is provided, by which damage of the electric junction box in the event of a collision of a vehicle can be reduced and a plurality of electric wires can be easily connected to the electric junction box with good workability. The arrangement structure includes: a high voltage battery; a battery pack for receiving the battery, the battery pack being mounted on a vehicle; and an electric junction box arranged in the battery pack, the electric junction box being connected to the battery, wherein on the assumption that a collision takes place on the battery pack-mounting side of the vehicle, the electric junction box is arranged on the side of a wall of the battery pack, the wall being situated on the side opposite to the collision side of the vehicle.

5 Claims, 4 Drawing Sheets

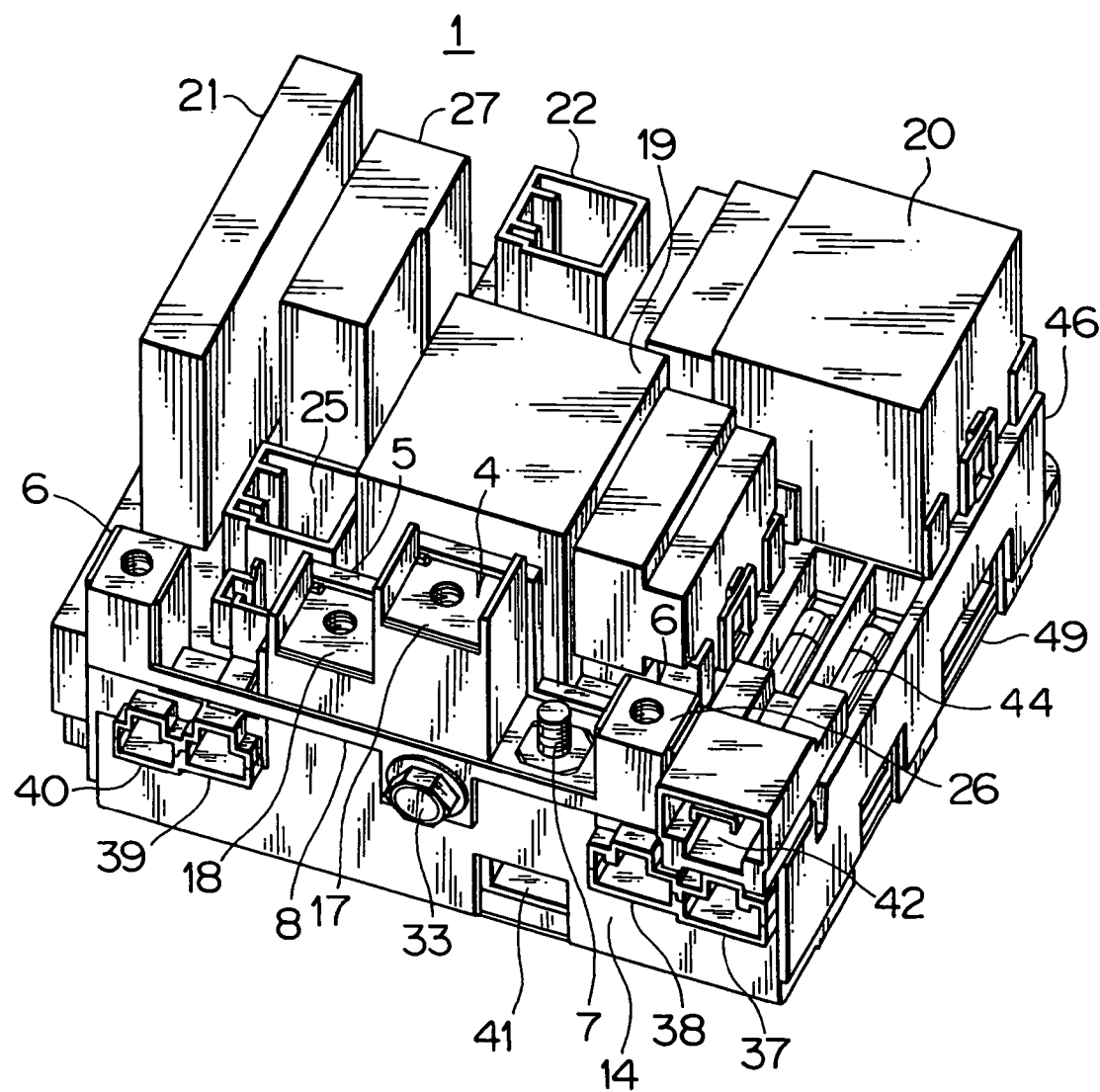
F I G. 3

ARRANGEMENT STRUCTURE OF ELECTRIC JUNCTION BOX

BACKGROUND OF THE INVENTION (1) Field of the Invention

The present invention relates to an arrangement structure of an electric junction box, in which the electric junction box is arranged in a battery pack mounted on an electric vehicle and electric wires are arranged from the electric junction box to an inverter and so on.

(2) Description of the Related Art

FIG. 4 shows an example of a conventional arrangement structure of an electric junction box (see Japanese Patent Application Laid-Open No. H9-277840; pages 4-5 and FIG. 1).

In this conventional arrangement structure, an electric junction box 72, inverter 73 for driving a motor, motor controller 74 and DC/DC converter 75 are arranged in an electric box 71, and the electric junction box 72, inverter 73 for driving a motor and DC/DC converter 75 are connected to each other by an electric harness 76 and connector 77.

A direct current power is supplied from a battery to the electric junction box 72 through an electric connector 78, then on the basis of a command from the motor controller 74 a direct current power from the battery is converted to an alternating current power by the inverter 73 so as to drive the motor and then, a direct current power from the electric junction box 72 is reduced by the DC/DC converter 75 and supplied to an electric instrument with an output harness 79.

The electric box 71 is placed on the front of a vehicle while the battery is placed on the rear of the vehicle. In FIG. 4, reference numerals 80 and 81 denote insulating casing, 82 a power transistor, and 83 a passage for cooling water.

FIG. 5 shows another example of a conventional arrangement structure of an electric junction box.

In this conventional arrangement structure, an electric junction box 85 is placed in a battery pack 84 made of metal mounted on the rear of an electric vehicle (including a hybrid vehicle), then each electric wire 86 is guided out from the electric junction box 85 penetrating through outer walls 84a-84c of the battery pack 84.

The electric junction box 85 is placed in a space 87 situated on one side in the battery pack 84 and the battery 88 is placed adjacent to the electric junction box 85 in the battery pack 84. The longitudinal direction of the battery pack 84 is parallel to the width direction of the vehicle. The battery pack 84 stably fixes the battery 88 and the electric junction box 85, that is, the battery 88 and the electric junction box 85 are fixed to a vehicle body by means of the battery pack 84.

An electric wire 89 continuing to an anode (i.e. plus electrode) of the battery 88 and an electric wire 90 continuing to a cathode (i.e. minus electrode) of the battery 88 are connected to the electric junction box 85, then a relay 91 of an anode and a relay 92 of a cathode for high voltage mounted on the electric junction box 85 are connected to the electric wires 89 and 90, so that the respective electric wires 86 of the anode and cathode advance toward the inverter from the electric junction box 85, the electric wire 86 for driving the relay and the electric wire 86 for an AC 100V conversion are guided out in three directions.

However, in the conventional arrangement structure (FIG. 5) of the electric junction box 85, in the event that the vehicle is brought into a collision (above all, into a rear-end collision), the electric junction box 85 is affected with a great damage in the battery pack 84 so that the relays 91 and 92 of high voltage, parts such as fuses and high voltage circuit mounted on the electric junction box 85 might be brought into a trouble such as a short circuit.

Moreover, since a plurality of the electric wires 86 are guided out into a plurality of directions from the electric junction box 85, the outer walls 84a-84c of the battery pack 84 must be provided with notched holes for guiding out the electric wire therethrough, causing deterioration in the collision strength of the battery pack 84. Furthermore, since the respective electric wires 86 must be connected through a connector and terminal mount in a multi-directions of the electric junction box 85, resulting in that the connection work needs a lot of time. Since the electric wires 86 must be protected with a vinyl tube or the like per several electric wires, resulting in that the mounting of the protection tubes needs a lot of time. Since the electric wires 86 must be separately arranged per several electric wires, resulting in that the arrangement work needs a lot of time.

SUMMARY OF THE INVENTION

It is therefore an objective of the present invention to solve the above problem and to provide an arrangement structure of an electric junction box, by which the damage of the electric junction box in the event of the collision of the vehicle can be reduced, the deterioration in the collision strength of the battery pack due to a plurality of the notched holes for guiding out the electric wires therethrough can be prevented from occurring, a plurality of the electric wires can be easily connected to the electric junction box with good workability, and a plurality of the electric wires can be easily arranged and protected outside the battery pack.

In order to attain the above objective, the present invention is to provide an arrangement structure of an electric junction box including:

a high voltage battery;

a battery pack for receiving the battery, the battery pack being mounted on a vehicle; and an electric junction box arranged in the battery pack, the electric junction box being connected to the battery, wherein on the assumption that a collision takes place on the battery pack-mounting side of the vehicle, the electric junction box is arranged on the side of a wall of the battery pack, the wall being situated on the side opposite to the collision side of the vehicle.

With the construction described above, in the event that a vehicle has a collision (a collision at the front or the back of the vehicle), since the electric junction box is arranged on the side of a wall of the battery pack, the wall being situated on a side opposite to a collision side of the vehicle, therefore a shock of the collision is absorbed in a space within the battery pack, thereby preventing the electric junction box from being affected by the direct shock. Accordingly, high voltage parts and circuits contained in the electric junction box can be prevented from being damaged, thereby preventing a trouble such as a short circuit from occurring and improving safety of the vehicle. The vehicle is an electric vehicle including a hybrid car. The high voltage parts include relays or fuses for connecting or cutting circuits of a battery and inverter.

Preferably, a plurality of electric wire connecting parts are concentratedly arranged on a wall of the electric junction box, and electric wires connected to the respective electric wire connecting parts are guided out from a wall of the battery pack, the wall of the battery pack being situated on the side opposite to the collision side of the vehicle.

With the construction described above, when the vehicle has a collision, the electric wire connection parts of the electric junction box can be prevented from being directly damaged and the electric wires guided out from the respective electric wire connection parts can also be prevented from being directly damaged. Accordingly, safety of a part for guiding out the electric wires of the electric junction box can be secured. Since the electric wires are not guided out into the respective different directions, the deterioration in the strength of the battery pack due to the notched holes for guiding out the electric wires therethrough can be prevented from occurring. The electric wire connection parts are, for example, connectors or terminal mounts. In the terminal mount, a terminal of the electric wire is connected by screwing to an end of a busbar or the like. The respective electric wires are concentratedly connected to the electric junction box on a wall of the battery pack. The connected electric wires are put together and guided out along a wall of the battery pack. Only one protection tube or uniting band is necessary to put the electric wires together as a wiring harness.

Further, with the construction described above, when the vehicle has a collision, since the electric wire connection parts of the electric junction box can be prevented from being directly damaged, a trouble such as a short circuit at the electric wire connecting parts can be prevented from occurring, thereby further improving safety of the vehicle. Moreover, since a plurality of the electric wires can be connected to the electric junction box at one place of the battery pack, therefore the connection workability can be improved. Since a plurality of the electric wires can be put together so as to be arranged, therefore the arranging workability can be improved. Since only one electric wire protection tube is needed, therefore the mounting workability of the protection tube can be improved, thereby reducing the cost of the parts.

In order to attain the above objective, the present invention is to provide an arrangement structure of an electric junction box including:

a high voltage battery;

a battery pack for receiving the battery, the battery pack being mounted on a vehicle; and an electric junction box arranged in the battery pack, the electric junction box being connected to the battery, wherein the electric junction box is arranged on the side of a wall of the battery pack, a plurality of electric wire connecting parts are concentratedly arranged on a wall of the electric junction box, and electric wires connected to the respective electric wire connecting parts are guided out from the wall of the battery pack.

With the construction described above, a plurality of the electric wires is concentratedly connected to the electric junction box on a wall of the battery pack. The connected electric wires are put together and guided out along a wall of the battery pack. Only one protection tube or uniting band is necessary to put the electric wires together as a wiring harness. Since the electric wires are not guided out into the respective different directions, the deterioration in the strength of the battery pack due to the notched holes for guiding out the electric wires therethrough can be prevented from occurring. If the wall of the battery pack is set to be a wall situated on a side opposite to a collision side of the vehicle, upon a collision of the vehicle the damage of the electric junction box and the electric wire connecting parts can be reduced.

Further, with the construction described above, since a plurality of the electric wires can be connected to the electric junction box at one place of the battery pack, therefore the connection workability can be improved. Since a plurality of the electric wires can be put together so as to be arranged, therefore the arranging workability can be improved. Since only one electric wire protection tube is needed, therefore the mounting workability of the protection tube can be improved, thereby reducing the cost of the parts.

BRIEF DESCRIPTION OF THE DRAWINGS

FIG. 3 is a perspective view illustrating an embodiment of an electric junction box in the present invention;

DESCRIPTION OF THE PREFERRED EMBODIMENTS

In the following, the preferred embodiments of the present invention will be explained with reference to the attached drawings.

Figure 1:
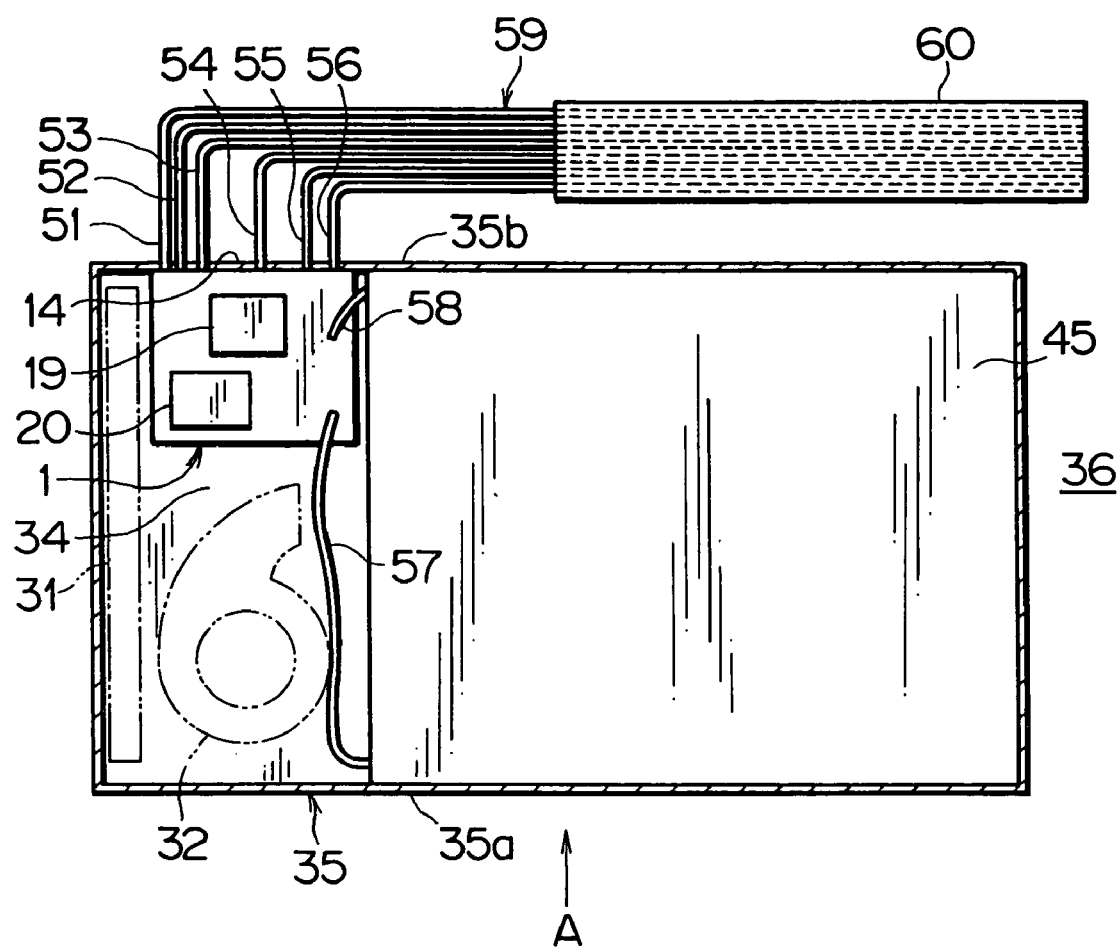
FIG. 1 is a plan view illustrating an preferred embodiment of an arrangement structure of an electric junction box according to the present invention.

FIG. 1 is a plan view illustrating an preferred embodiment of an arrangement structure of an electric junction box according to the present invention. In FIG. 1, the upward direction of this drawing is the forward direction of the vehicle, while the downward direction of this drawing is the backward direction of the vehicle.

In the structure shown in FIG. 1, in which an electric junction box 1 is arranged in a casing-shaped battery pack 35 made of metal (e.g. iron) to be mounted on an electric vehicle (including a hybrid vehicle), the electric junction box 1 is arranged at a position far from an outer wall 35a of the battery pack 35 in a collision direction A of the vehicle.

A collision at the back of the vehicle (i.e. a collision which occurs on the rear side of the vehicle) is assumed in FIG. 1 and therefore, in this case, the wall situated on the collision side of the vehicle is the outer wall 35a of the battery pack 35. That is, when the laterally-long battery pack 35 is mounted in a laterally-long form on the rear of the vehicle (that is, the longitudinal direction of the battery pack 35 being the width direction of the vehicle), the electric junction box 1 is arranged on the side of a wall 35b, thereby reducing the damage of the electric junction box 1 upon the collision at the back of the vehicle.

On the other hand, when the battery pack 35 is mounted on the front (i.e. on the side of a hood) of the vehicle, that is, when a collision at the front of the vehicle (i.e. a collision which occurs on the front side of the vehicle) is assumed, the battery pack 35 is arranged on the side of the outer wall 35a. In this case, the wall situated on the collision side of the vehicle is the wall 35b of the battery pack 35.

In the battery pack 35, a plurality of cells for constituting a battery 45 are connected in series and arranged, and the electric junction box 1 is arranged adjacent to the battery 45 in a side space 34 of the battery pack 35 in such a direction that the electric junction box 1 is hardly affected by a shock upon a collision.

In the space 34 in the battery pack 35, for example, a DC/DC converter 31 is arranged in a long and narrow form in the back-and-forth direction of the battery pack 35, adjacently to the electric junction box 1 at an edge opposite to the battery 45. A battery-cooling fan 32 is arranged between the DC/DC converter 31 and the battery 45 in the rear of the electric junction box 1. The DC/DC converter 31 in a long and narrow form together with the battery 45 absorb the shock upon a collision. The hollow fan 32 is easily crushed upon the collision, thereby absorbing the shock so as to protect the electric junction box 1.

The electric junction box 1 is connected to an electric wire 57 that continues to an anode (i.e. plus electrode) of the battery 45 and an electric wire 58 that continues to an cathode (i.e. minus electrode) of the battery 45. A plurality of electric wires 51-56 are concentratedly guided out from a front wall 14 of the electric junction box at the front wall 35b of the battery pack 35.

The electric wires 51-56 are guided out to the outside penetrating through the front wall 35b of the battery pack 35 and arranged in the width direction of the vehicle along the front wall 35b. The electric wires 51-56 are bundled to form a wiring harness 59 with a protection tube 60 such as a vinyl tube and corrugated tube or by winding with a tape.

The electric junction box 1 includes a high voltage relay 19 of the anode that continues to the electric wire 57 of the anode and a high voltage relay 20 of the cathode that continues to the electric wire 58 of the cathode of the battery-side. The relay 19 of the anode is connected to an electric wire 53 of the anode of the inverter-side while the relay 20 of the cathode is connected to an electric wire 54 of the cathode of the inverter-side. The relays 19 and 20 are used for connecting or cutting a circuit that connects the battery 45 to the inverter (not shown in the figure).

In FIG. 1, the reference numeral 51 denotes an electric wire of the anode for AC100V and so on at the inverter-side, 52 an electric wire for driving a relay (i.e. for magnetization), 55 an electric wire of the cathode for AC100V and so on, and 56 an electric wire for detection circuit of a service plug (explained later on). The wires 51 and 55 are plug-connected to accessories and so on. An electric wire that connects the electric junction box 1 to the DC/DC converter 31 is arranged inside the battery pack 35. A battery pack unit 36 includes at least the battery 45, electric junction box 1 and battery pack 35.

Figure 2:
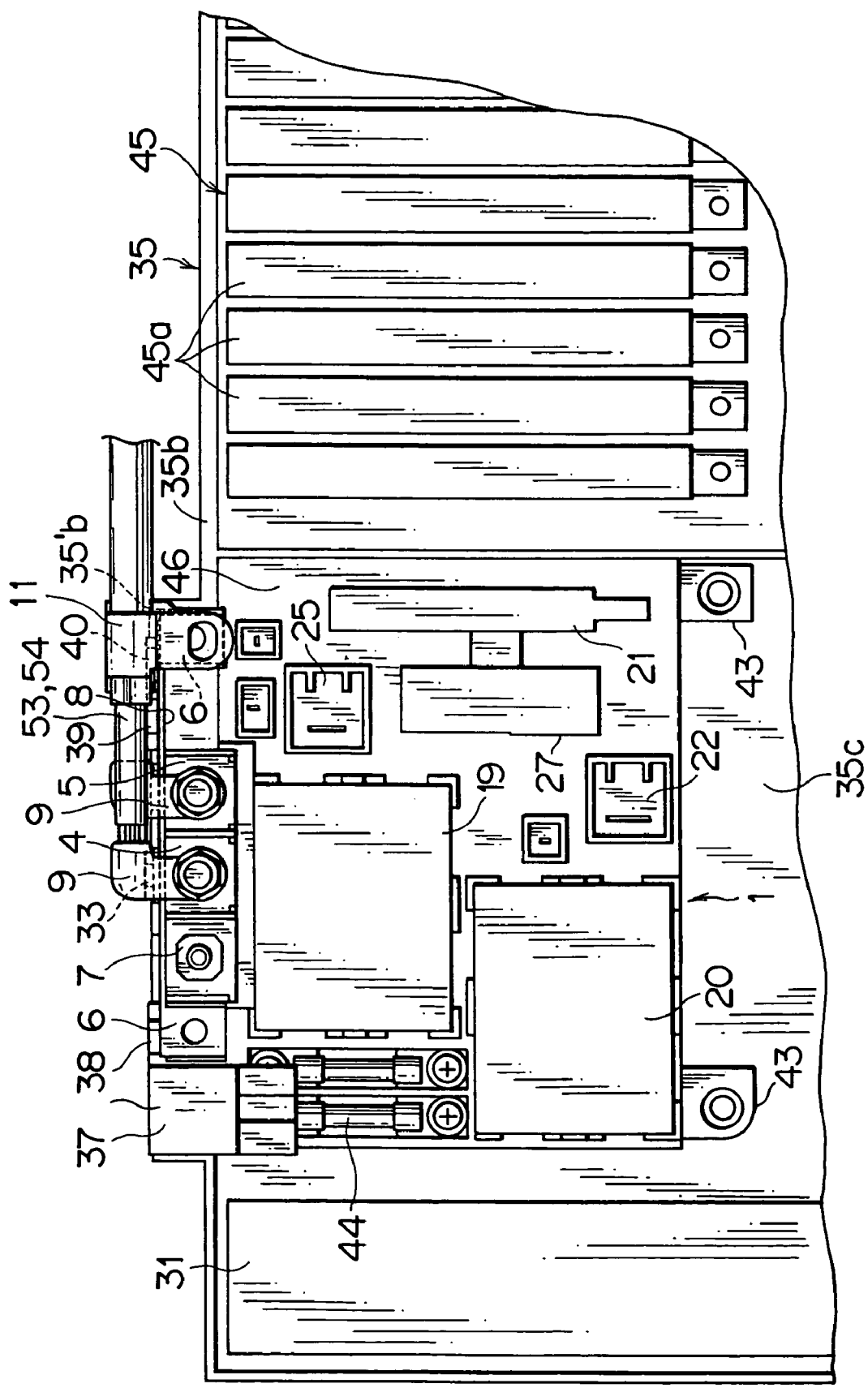
FIG. 2 is a plan view illustrating in detail a primary part of an preferred embodiment of an arrangement structure of an electric junction box according to the present invention.
Figure 4:
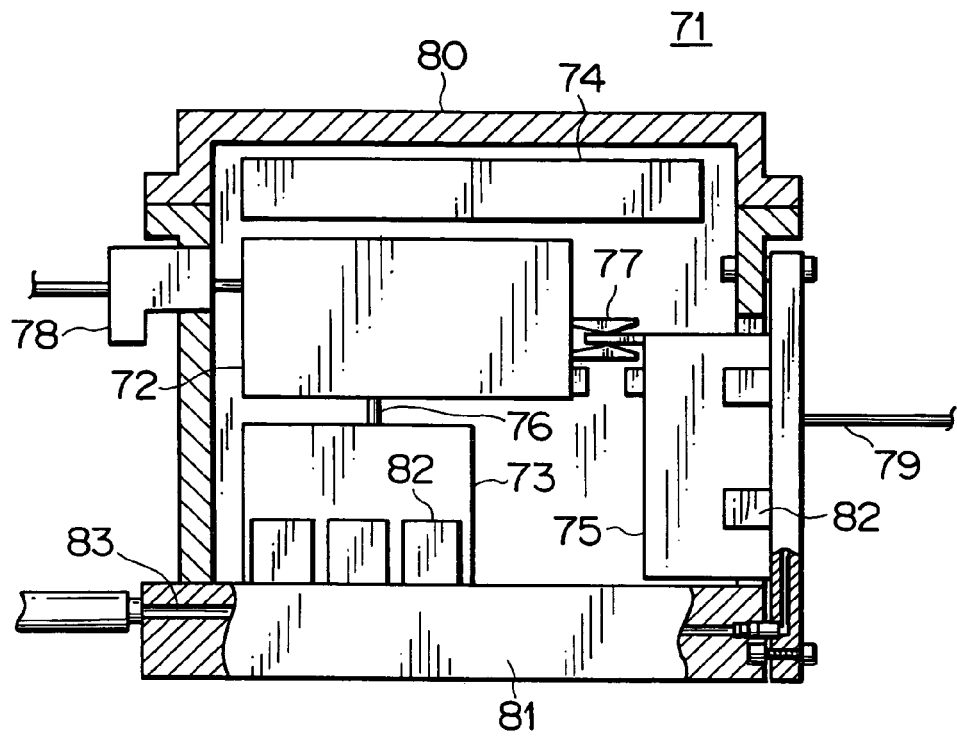
FIG. 4 is a longitudinal cross sectional view illustrating an example of a conventional arrangement structure of an electric junction box.
Figure 5:
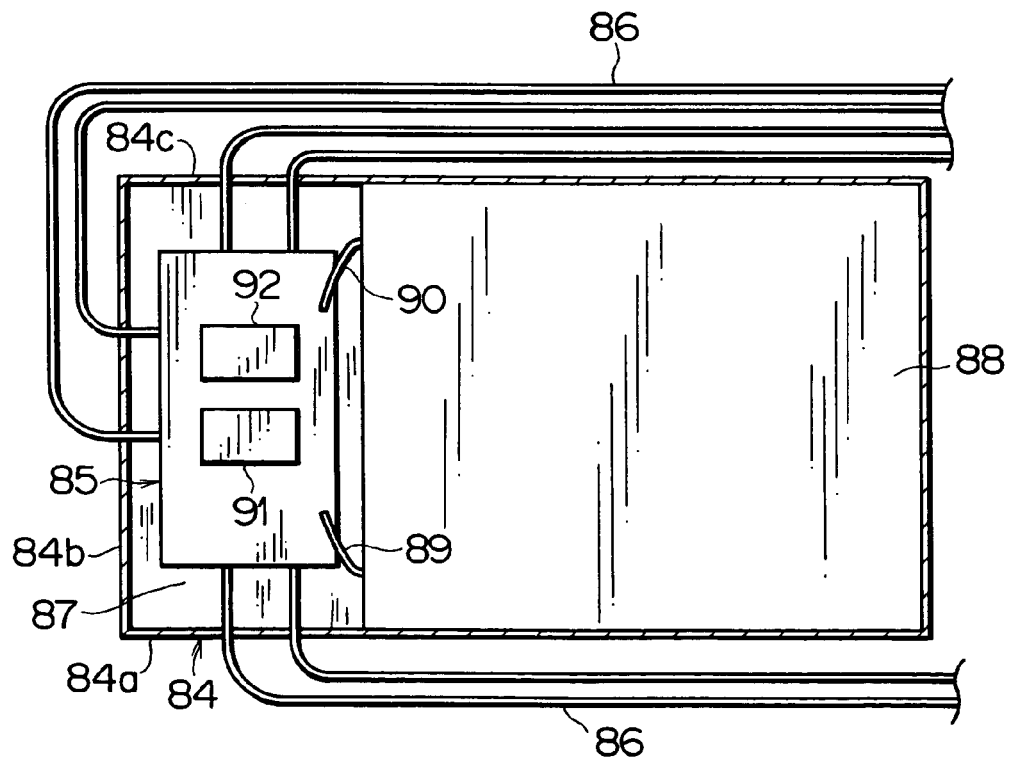
FIG. 5 is a plan view illustrating another example of a conventional arrangement structure of an electric junction box.

FIG. 2 is a plan view illustrating in detail an arrangement structure, in which the electric junction box 1 is arranged in the battery pack 35.

In FIG. 2, the reference numeral 19 denotes a relay of the anode, 20 a relay of the cathode, 22 a connector of the anode for connecting the wire 57 (see FIG. 1) of the anode on the battery-side, 25 a connector of the cathode for connecting the wire 58 of the cathode on the battery-side, 4 a terminal mount that continues to a circuit of the relay 19 of the anode, 5 a terminal mount that continues to a circuit of the relay 20 of the cathode, 7 a terminal mount for connecting the DC/DC converter, 6 a terminal mount for ground, 44 a small current fuse, 37 a connector that continues to the small current fuse 44, 39 a connector of cathode of a circuit for AC100V conversion, 40 a connector of the anode for a service plug detection circuit, 45a each cell for constructing the battery 45, and 31 a DC/DC converter.

The terminal mounts 4, 5 and 6 are connected to the respective shielded electric wires 53, 54 through plate-shaped terminals 9. The electric wires 53, 54 are horizontally arranged along the front wall 35b of the battery pack 35 as a group. The electric junction box 1 is bolt-fixed on a bottom wall 35c of the battery pack 35 with a bracket 43.

The terminal mounts (electric wire connecting parts) 4 and 5 of the anode and cathode, the terminal mount (electric wire connecting part) 6 for ground, and the connectors (electric wire connecting parts) 37-40 are arranged in a lateral line in its plan view. The front wall 35b of the battery pack 35 projects forward a little as a projecting wall 35b', in which the respective terminal mounts 4-6 are situated.

FIG. 3 is a perspective view of the electric junction box 1 viewed from the front. The respective connectors 37-40 project a little from a front wall surface 14 of the electric junction box 1. Connector-receiving chambers of the respective connectors 37-40 are opened forwardly. A male terminal is arranged in the connector-receiving chamber. A connector housing and the terminal constitute each connector 37-40. If a female terminal is received in the connector housing, the connector does not have the connector-receiving chamber.

In FIG. 3, the reference numeral 37 denotes a connector of the anode for AC100V conversion circuit, 38 a connector for a relay driving circuit, 39 denotes a connector of the cathode for AC100V conversion circuit, 40 a connector for a service plug detection circuit, 41 and 42 connectors for connecting circuits on the side of the vehicle.

The terminal mounts 4-6 are raised up vertically from the front wall surface 14 of the electric junction box 1 and have respective terminal plates 17, 18 and 26 at the top ends. The terminal mounts 4-6 are constructed by placing the terminal plates 17, 18 and 26 of busbars on insulating seats, nuts (not shown in the figure) are provided in the seats, and the plate terminals of the electric wires 53, 54 are screw-connected to the terminal plates having respective holes. The busbars are arranged in the electric junction box 1.

In FIG. 3, the reference numeral 4 denotes a terminal mount of the anode for connecting a inverter circuit, 5 a terminal mount of the cathode for connecting a inverter circuit, 6 a terminal mount for connecting a ground circuit, and 7 a terminal mount for connecting a DC/DC converter circuit. Only the terminal mount 7 has a structure, in which a bolt projects. The other terminal mounts 4-6 have respective nuts inside.

A pair of the terminal mounts 6 for ground is provided right and left. Both of the terminal mounts 6 are connected by the busbar 8. The busbar 8 is screwed to the front wall 35b of the battery pack 35 (see FIG. 2) with a bolt 33. An electric wire for ground (ground wire of the shielded electric wires 53, 54 shown in FIG. 2) is grounded to the vehicle body (not shown in the figure) through the busbar 8 and the battery pack 35.

In FIG. 3, the reference numeral 19 denotes a relay of the anode, 20 a relay of the cathode, 22 a connector of the anode for connecting a battery, 25 a connector of the cathode for connecting a battery, 53 a small current fuse, 21 a service plug, and 27 a current sensor. The service plug is used for an operator to cut a circuit between the battery 45 and the relays 19, 20. A service plug detecting circuit 56 (see FIG. 1) is a short circuit for detecting whether or not the shielding is present.

The small current fuse 44 continues to an output circuit of the relay 19 of the anode. The terminal mount 7 for connecting a DC/DC converter circuit and the connectors 37, 39 for connecting an AC100V conversion circuit are connected to a circuit on the side of output of the respective relays 19, 20. The current sensor 27 is arranged on a busbar circuit between the relay 20 of the cathode and the service plug 21.

The electric junction box 1 includes an upper cover 46 made of synthetic resin as a junction box body, middle cover (not shown in the figure), and lower cover 49. The relays 19, 20 and connectors 22, 25 are provided in the upper cover 46. The busbar circuit (not shown in the figure) as a high voltage circuit is arranged being laminated between the upper cover 46 and the middle cover. The relays 19, 20 are connected to the busbar circuit through a junction terminal (not shown). The busbar circuit integrally continues to the terminal plate 17, 18 on the terminal mount 4, 5 or a terminal in the connector 37-40. A large current fuse (not shown) and the current sensor 27 are provided in the middle cover. The large current fuse is situated between the circuit 57 (see FIG. 1) of the anode at the battery-side and the service plug 21. An electronic control circuit is provided in the lower cover 49.

As shown in FIG. 1, since the electric junction box 1 described above is arranged on the side of the front end of the battery pack 35, therefore the damage of the electric junction box 1 caused by a collision of the vehicle from the back can be minimized, thereby preventing a short circuit due to the relay 19, 20 as a high pressure component, a large current fuse and a busbar as a high pressure circuit from occurring.

As shown in FIGS. 2 and 3, since the connectors 37-40 and the terminal mounts 4-7 are concentratedly arranged on the front wall surface 35b of the electric junction box 1, therefore as shown in FIG. 1 a plurality of the electric wires 51-56 can be concentratedly arranged on the front wall surface 14 of the electric junction box 1, thereby improving the efficiency of the connection work. Moreover, since a plurality of the electric wires 51-56 can be arranged as a group, therefore the arranging workability can be improved. Since a plurality of the electric wires 51-56 can be united with a protection tube, a band or a tape so as to be protected, therefore the protection property can be improved and furthermore, the number of the components such as the protection tube and the cost of the components can be reduced.

In a case when the battery pack 35 is not mounted on the rear side of the vehicle but on the front side of the vehicle, in FIG. 1 the electric junction box 1 is arranged on the rear side of the battery pack 35 (i.e. on the lower side of this drawing), that is, the electric junction box 1 is arranged on the side of the outer wall 35a of the battery pack 35, and the connectors 37-40 and the terminal mounts 4-7 are concentratedly arranged on the side of the rear wall surface of the electric junction box 1 (i.e. on the lower side of this drawing).

The electric junction box 1 as explained above with reference to FIG. 3 is merely an example. That is, the arrangement structure of the electric junction box of the present invention is not limited by the electric junction box 1 as explained above. One terminal mount 6 for ground may be sufficient and in this case the outside busbar 8 may not be necessary. A terminal mount may be provided instead of the connector 22, 25 for supplying electric power. A connector may be provided instead of the terminal mount 4-6. The service plug 21 or the fuse 44 may or may not be provided according to need. The busbar in the electric junction box may be replaced by an electric wire. That is, an electric junction box having various different forms may be used according to need.

What is claimed is:

1. An arrangement structure of an electric junction box in a battery pack of a vehicle comprising:
   a high voltage battery;
   a battery pack for receiving the battery having a front wall, rear wall and side walls, the battery pack being mounted at a rear end of a vehicle; and
   an electric junction box arranged in the battery pack, the electric junction box being connected to the battery,
   wherein the electric junction box is arranged on said front wall of the battery pack, said front wall being situated on the side opposite to the rear end of the vehicle.

2. The arrangement structure of an electric junction box according to claim 1, wherein a plurality of electric wire connecting parts are concentratedly arranged on a front wall of the electric junction box, and electric wires connected to the respective electric wire connecting parts are guided out only from said front wall of the battery pack, said front wall of the battery pack being situated on the side opposite to the rear end of the vehicle.

3. An arrangement structure of an electric junction box in a battery pack of a vehicle comprising:
   a high voltage battery;
   a battery pack for receiving the battery having a front wall, rear wall and side walls, the battery pack being mounted on a vehicle; and
   an electric junction box arranged in the battery pack, the electric junction box being connected to the battery,
   wherein the electric junction box is arranged on one of said front wall and rear wall of the battery pack, a plurality of electric wire connecting parts are concentratedly arranged on a wall of the electric junction box, and electric wires connected to the respective electric wire connecting parts are guided out only from said front or rear wall of the battery pack on which said electric junction box is arranged.

4. An arrangement structure of an electric junction box in a battery pack of a vehicle comprising:
   a high voltage battery;
   a battery pack for receiving the battery having a front wall, rear wall and side walls, the battery pack being mounted at a front end of a vehicle; and
   an electric junction box arranged in the battery pack, the electric junction box being connected to the battery,
   wherein the electric junction box is arranged on said rear wall of the battery pack, said rear wall being situated on the side opposite to the front end of the vehicle.

5. The arrangement structure of an electric junction box according to claim 4, wherein a plurality of electric wire connecting parts are concentratedly arranged on a rear wall of the electric junction box, and electric wires connected to the respective electric wire connecting parts are guided out only from said rear wall of the battery pack, said rear wall of the battery pack being situated on the side opposite to the front end of the vehicle.

* * * * *